United States Patent
Lee et al.

(10) Patent No.: US 8,878,795 B2
(45) Date of Patent: Nov. 4, 2014

(54) TOUCH SENSING APPARATUS AND OPERATING METHOD THEREOF

(75) Inventors: Sang Ho Lee, Suwon (KR); Tah Joon Park, Suwon (KR); Yong Il Kwon, Suwon (KR); Gyung Hee Hong, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 140 days.

(21) Appl. No.: 13/347,241

(22) Filed: Jan. 10, 2012

(65) Prior Publication Data

US 2013/0113722 A1 May 9, 2013

(30) Foreign Application Priority Data

Nov. 4, 2011 (KR) ........................ 10-2011-0114490

(51) Int. Cl.
- *G09G 5/00* (2006.01)
- *G06F 3/041* (2006.01)
- *G06F 1/32* (2006.01)

(52) U.S. Cl.
CPC ................ *G06F 1/3206* (2013.01); *G09G 5/00* (2013.01); *G06F 3/0416* (2013.01); *G06F 1/3231* (2013.01)
USPC ...... 345/173; 345/174; 178/18.01; 178/18.06

(58) Field of Classification Search
USPC ...................... 345/173–178; 178/18.01–19.06
See application file for complete search history.

(56) References Cited

U.S. PATENT DOCUMENTS

| | | | |
|---|---|---|---|
| 5,920,309 A * | 7/1999 | Bisset et al. | ........... 345/173 |
| 7,737,957 B2 | 6/2010 | Lee et al. | |
| 2008/0062150 A1 | 3/2008 | Lee | |
| 2008/0277171 A1 | 11/2008 | Wright | |
| 2009/0189867 A1* | 7/2009 | Krah et al. | ........... 345/173 |
| 2010/0265205 A1 | 10/2010 | Park et al. | |
| 2010/0292945 A1 | 11/2010 | Reynolds et al. | |
| 2011/0115732 A1* | 5/2011 | Coni et al. | ........... 345/173 |

FOREIGN PATENT DOCUMENTS

| | | |
|---|---|---|
| KR | 10-2009-0107049 | 10/2009 |
| KR | 10-2010-0115449 | 10/2010 |
| WO | WO 2008/085720 A1 | 7/2008 |

OTHER PUBLICATIONS

Korean Office Action issued May 28, 2013 in corresponding Korean Application No. 10-2011-0114490.
German Office Action issued Jul. 17, 2012 in corresponding German Patent Application No. 102012000336.6.

* cited by examiner

*Primary Examiner* — Jennifer Nguyen (57) ABSTRACT

There are provided a touch sensing apparatus and an operating method thereof. The touch sensing apparatus includes: a panel unit including a plurality of first electrodes and a plurality of second electrodes, the first and second electrodes intersecting each other; a circuit unit applying first driving signals to the first electrodes and detecting sensed signals from the second electrodes; and a control unit controlling an operation of the circuit unit, wherein the control unit controls the circuit unit to simultaneously apply the first driving signals to the first electrodes during a first duration corresponding to a sleep mode and detect first sensed signals from the second electrodes, and determines whether a valid touch has occurred during the first duration to determine whether to cancel the sleep mode.

8 Claims, 8 Drawing Sheets

TOUCH SENSING APPARATUS AND OPERATING METHOD THEREOF

CROSS-REFERENCE TO RELATED APPLICATIONS

This application claims the priority of Korean Patent Application No. 10-2011-0114490 filed on Nov. 4, 2011, in the Korean Intellectual Property Office, the disclosure of which is incorporated herein by reference.

BACKGROUND OF THE INVENTION

1. Field of the Invention

The present invention relates to a touch sensing apparatus and an operating method thereof that maximize a duration of a sleep mode by simplifying driving signal application and signal sensing operations in the sleep mode to reduce power consumption and allow for switching to an active mode only with respect to a valid touch.

2. Description of the Related Art

Touch sensing apparatuses such as a touch screen, a touch pad, and the like, as user interface apparatuses attached to a display apparatus to provide an intuitive input method to a user, have been widely applied to a variety of electronic apparatuses such as a cellular phone, a personal digital assistant (PDA), a navigation device and the like, in recent years. In particular, recently, with the increase in demand for smart phones, the rate at which a touch screen has been adopted as a touch sensing apparatus capable of providing various input methods in a limited form factor has increased on a daily basis.

Touch screens adopted in portable electronic apparatuses may be largely classified into resistive type and capacitive type touch screens, according to a touch sensing method. Since the capacitive type touch screen is advantageous in that a life-span thereof may be relatively extended, and various input methods and gestures can be easily implemented, the adoption rate of the capacitive type touch screen has steadily increased. In particular, it is easier to implement a multi-touch interface in the capacitive type touch screen than in the resistive type touch screen, and as a result, the capacitive type touch screen is widely applied to an electronic apparatus such as a smart phone, or the like.

Touch screens have come to be widely adopted, even in home appliances and industrial machines, but a portable electronic apparatus is perhaps of the greatest importance in the field of touch screens. Unless the portable electronic apparatus is in a condition to continuously receive power through a charger, a USB cable, or the like, all modules in the portable electronic apparatus are necessarily operated on power supplied from a battery, and as a result, a module which can be stably operated while consuming a low amount of power or an operating method thereof needs to be applied. Due to the fact that it is uncertain when the application of a user's touch will be carried out, the touch screen is continuously operated in the active mode, and thus, a large amount of power may be consumed to thereby decrease a battery charge and reduce applicability of the touch screen to a mobile apparatus.

SUMMARY OF THE INVENTION

An aspect of the present invention provides a touch sensing apparatus and an operating method thereof that divides an operating mode of the touch sensing apparatus into a sleep mode and an active mode, frequently switches the operating mode, approves switching to the active mode only when a valid touch is applied in the sleep mode, and increases a duration of the sleep mode by simplifying a signal sensing operation for determining whether a valid touch has been applied in the sleep mode to reduce total power consumption and ensure accurate operations.

According to an aspect of the present invention, there is provided a touch sensing apparatus, including: a panel unit including a plurality of first electrodes and a plurality of second electrodes, the first and second electrodes intersecting each other; a circuit unit applying first driving signals to the plurality of first electrodes and detecting sensed signals from the plurality of second electrodes; and a control unit controlling an operation of the circuit unit, wherein the control unit controls the circuit unit to simultaneously apply the first driving signals to the plurality of first electrodes during a first duration corresponding to a sleep mode and detect first sensed signals from the plurality of second electrodes, and determines whether a valid touch has occurred during the first duration to determine whether to cancel the sleep mode.

When it is determined that the valid touch has occurred during the first duration, the control unit may terminate the first duration to cancel the sleep mode.

The control unit may initiate a second duration corresponding to an active mode after cancelling the sleep mode by terminating the first duration, and control the circuit unit to sequentially apply second driving signals to the plurality of first electrodes during the second duration and detect second sensed signals from the plurality of second electrodes.

The control unit may determine a touch from the second sensed signals.

The control unit may control the circuit unit to individually apply second driving signals to the plurality of respective first electrodes, during a second duration corresponding to an active mode.

The control unit may set a first reference value for determining whether a valid touch has occurred during the first duration corresponding to the sleep mode and a second reference value for determining whether a valid touch has occurred during the second duration corresponding to the active mode to be different from each other.

The control unit may set the first reference value and the second reference value as a voltage level or a time.

According to another aspect of the present invention, there is provided an operating method of a touch sensing apparatus, including: simultaneously applying first driving signals to a plurality of first electrodes during a first duration; simultaneously detecting first sensed signals from a plurality of second electrodes intersecting the plurality of first electrodes; determining whether a valid touch has occurred based on the first sensed signals; and determining whether to terminate the first duration according to valid touch occurrence.

The operating method may further include terminating the first duration and initiating a second duration when the valid touch has occurred, and sequentially applying second driving signals to the plurality of first electrodes; and determining a touch by detecting second sensed signals from the plurality of second electrodes.

The first duration may correspond to a sleep mode of the touch sensing apparatus, and the second duration may correspond to an active mode of the touch sensing apparatus.

In the determining of the touch, at least one of a position, number, and movement of the touch may be determined based on the second sensed signals.

The determining of the touch may include determining whether the valid touch has occurred by comparing the second sensed signals with predetermined second reference values.

The operating method may further include terminating the first duration and initiating a third duration having a predetermined time range when it is determined that the valid touch has not occurred; and simultaneously applying the first driving signals to the plurality of first electrodes, by initiating the first duration when the third duration is terminated.

In the determining of the valid touch occurrence, it is determined whether the valid touch has occurred by comparing the first sensed signals with predetermined first reference values.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will be described in detail with reference to the accompanying drawings. These embodiments will be described in detail in order to allow those skilled in the art to practice the present invention. It should be appreciated that various embodiments of the present invention are different but are not necessarily exclusive. For example, specific shapes, configurations, and characteristics described in an embodiment of the present invention may be implemented in another embodiment without departing from the spirit and scope of the present invention. In addition, it should be understood that positions and arrangements of individual components in each embodiment may be changed without departing from the spirit and scope of the present invention. Therefore, a detailed description provided below should not be construed as being restrictive. In addition, the scope of the present invention is defined only by the accompanying claims and their equivalents if appropriate. Similar reference numerals will be used to describe the same or similar functions throughout the accompanying drawing.

Hereinafter, embodiments of the present invention will be described in detail with reference to the accompanying drawings so that those skilled in the art may easily practice the present invention.

Figure 1:
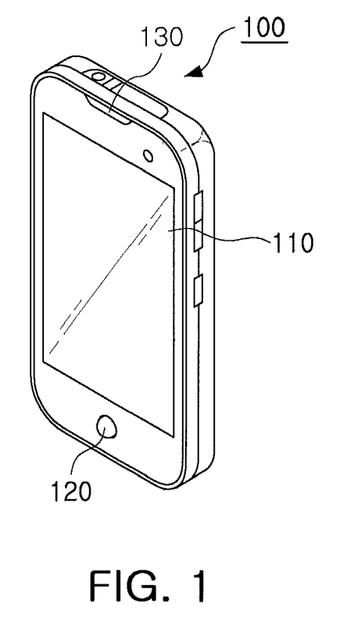
FIG. 1 is a perspective view illustrating an exterior of an electronic apparatus having a touch sensing apparatus according to an embodiment of the present invention.

FIG. 1 is a view showing an electronic apparatus to which a touch sensing apparatus according to an embodiment of the present invention is applicable. Referring to FIG. 1, an electronic apparatus 100 according to the present embodiment includes a display apparatus 110 for outputting an image, an input unit 120, an audio unit 130 for outputting audio, and a touch sensing apparatus integrated with the display apparatus 110.

As shown in FIG. 1, in the case of a mobile apparatus, the touch sensing apparatus is generally provided integrally with the display apparatus and needs to have high light transmissivity enough to transmit the image displayed by the display apparatus. Therefore, the touch sensing apparatus may be implemented by forming a sensing electrode using a transparent and electrically conductive material such as indium-tin oxide (ITO), indium zinc oxide (IZO), zinc oxide (ZnO), carbon nano tube (CNT), or graphene, on a base substrate formed of a transparent film material such as polyethylene terephthalate (PET), polycarbonate (PC), polyethersulfone (PES), polyimide (PI), or the like. The display apparatus may include a wiring pattern disposed in a bezel area 115 thereof, and the wiring pattern is connected to the sensing electrode formed of the transparent conductive material. Since the wiring pattern is visually shielded by the bezel area 115, the wiring pattern may be formed of a metallic material such as silver (Ag), copper (Cu), or the like.

In the case in which the touch sensing apparatus according to the embodiment of the present invention may not be provided integrally with the display apparatus like in a touch pad of a notebook computer, the touch sensing apparatus may be manufactured by simply patterning the sensing electrode on a circuit substrate with metal. However, for convenience of explanation, the touch sensing apparatus and method according to the embodiment of the present invention will be described based on the touch screen.

Figure 2:
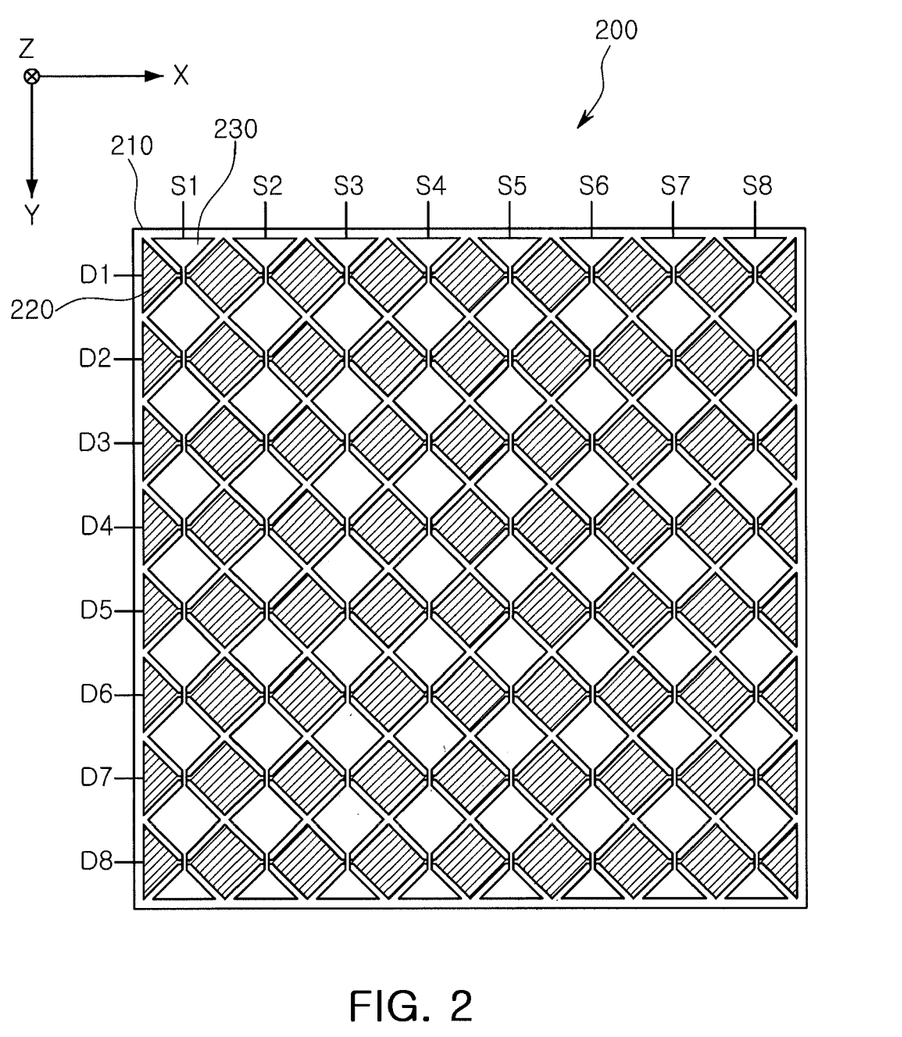
FIG. 2 is a plan view illustrating a touch sensing panel electrically connected with a touch sensing apparatus according to an embodiment of the present invention.

FIG. 2 is a plan view showing a touch sensing panel electrically connected with a touch sensing apparatus according to an embodiment of the present invention.

Referring to FIG. 2, a touch sensing panel 200 according to this embodiment includes a substrate 210 and a plurality of sensing electrodes 220 and 230 provided on the substrate 210. Although not shown in FIG. 2, each of the plurality of sensing electrodes 220 and 230 may be electrically connected with the wiring pattern of the circuit board attached to one end of the substrate 210 through a wire and a bonding pad. A controller integrated circuit is mounted on the circuit board to detect sensed signals generated from the plurality of sensing electrodes 220 and 230 and determine the touch based thereon.

In the touch screen apparatus, the substrate 210 may be a transparent substrate in which the sensing electrodes 220 and 230 can be formed, and may be formed of a plastic material such as polyimide (PI), polymethylmethacrylate (PMMA), polyethyleneterephthalate (PET), or polycarbonate (PC) or tempered glass. Further, apart from an area in which the sensing electrodes 220 and 230 are formed, a predetermined printing area for the wire connected with the sensing electrodes 220 and 230 may be formed on the substrate 210 in order to visually shield the wire formed of an opaque metallic material.

The plurality of sensing electrodes 220 and 230 may be provided on one surface or both surfaces of the substrate 210. In the case of the touch screen apparatus, the plurality of sensing electrodes 220 and 230 may be formed of a transparent conductive material such as indium-tin oxide (ITO), indium zinc-oxide (IZO), zinc oxide (ZnO), carbon nano tube (CNT), or grapheme based material. Although the sensing electrodes 220 and 230 having a rhombus or diamond-shaped pattern are shown in FIG. 2, the sensing electrodes 220 and 230 may have various patterns using polygonal shapes such as a rectangle, a triangle, and the like.

The plurality of sensing electrodes 220 and 230 include first electrodes 220 extending in an X-axis direction and second electrodes 230 extending in a Y-axis direction. The first electrodes 220 and the second electrodes 230 may be provided on both surfaces of the substrate 210 or provided on different substrates to intersect each other. In the case in which both the first and second electrodes 220 and 230 are provided on one surface of the substrate 210, a predetermined insulating layer may be partially formed at an intersecting point between the first and second electrodes 220 and 230.

A touch sensing apparatus that is electrically connected with the plurality of sensing electrodes 220 and 230 to sense a touch detects capacitive variations sensed in the plurality of sensing electrodes 220 and 230 and senses the touch therefrom. The first electrodes 220 are connected to channels defined as D1 to D8 in the controller integrated circuit to receive predetermined driving signals, and the second electrodes 230 are connected to channels defined as S1 to S8 to be used in order for the controller integrated circuit to detect sensed signals. In this case, the controller integrated circuit may detect mutual-capacitance variations generated between the first and second electrodes 220 and 230 as the sensed signals, and may sequentially apply the driving signals to the individual first electrodes 220 and simultaneously detect capacitance variations from the second electrodes 230.

Figure 3:
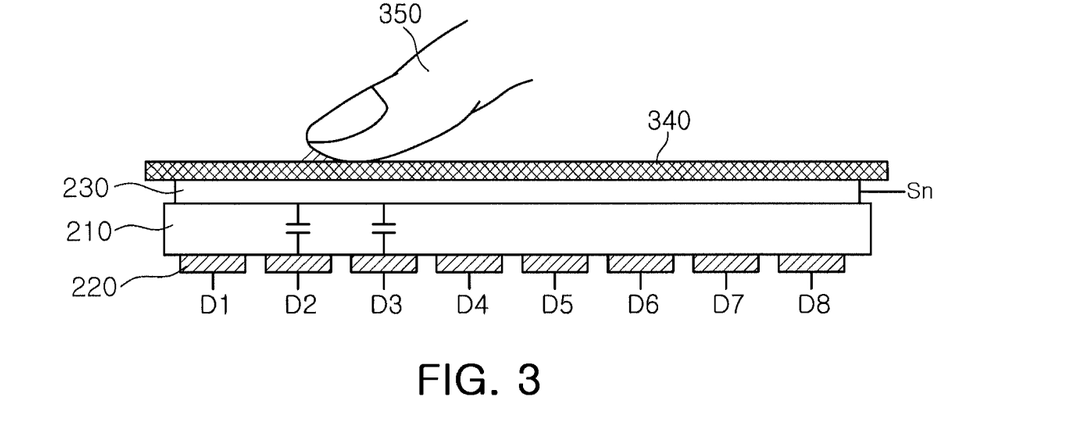
FIG. 3 is a cross-sectional view of the touch sensing panel shown in FIG. 2.

FIG. 3 is a cross-sectional view of the touch sensing panel shown in FIG. 2.

FIG. 3 is a cross-sectional view of the touch sensing panel 200 shown in FIG. 2 taken in a Y-Z direction. The touch sensing panel 200 may further include a cover lens 340 receiving the touch, in addition to the substrate 210 and the plurality of sensing electrodes 220 and 230 described in FIG. 2. The cover lens 340 is provided on the second electrodes 330 used to detect the sensed signals such that it may receive the touch from a touching object 350 such as a finger.

When the driving signals are sequentially applied to the first electrodes 220 through the channels D1 to D8, mutual-capacitance is generated between the first and second electrodes 220 and 230. When the driving signals are sequentially applied to the first electrodes 220, a capacitance variation may occur between the first and second electrodes 220 and 230 adjacent to an area contacted by the touching object 350. The capacitance variation may be proportionate to a dimension of an area overlapped among the touching object 350, the first electrodes 220 applied with the driving signals and the second electrodes 230. In FIG. 3, the mutual-capacitance generated between the first and second electrodes 220 and 230 connected to the channels D2 and D3 is influenced by the touching object 350.

Figure 4:
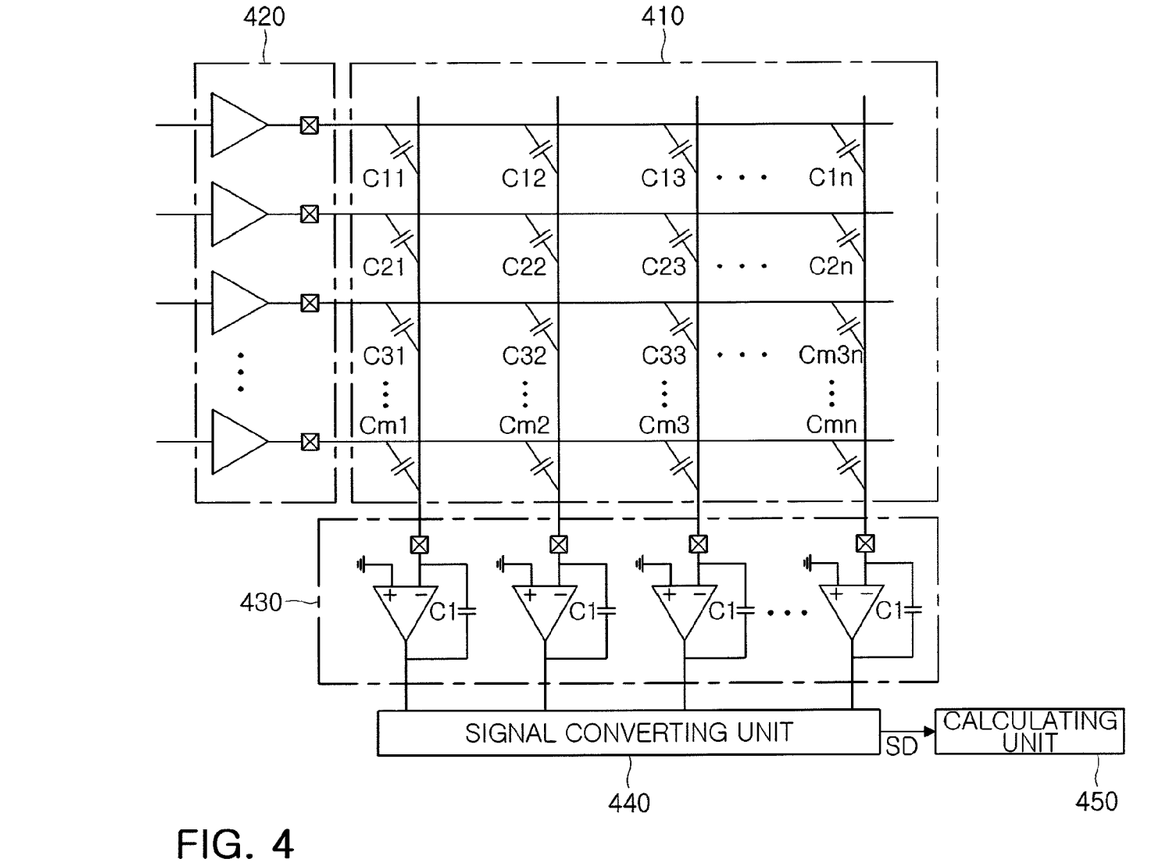
FIG. 4 is a block diagram of a touch sensing apparatus according to an embodiment of the present invention.

FIG. 4 is a block diagram of a touch sensing apparatus according to an embodiment of the present invention.

Referring to FIG. 4, a touch sensing apparatus according to the present embodiment includes a panel unit 410, a driving circuit unit 420, a sensing circuit unit 430, a signal converting unit 440, and a calculating unit 450. The panel unit 410 includes a plurality of first electrodes extending in a first axis direction (a horizontal direction of FIG. 4) and a plurality of second electrodes extending in a second axis direction intersecting the first axis direction (a vertical direction of FIG. 4). Variations in capacitance C11 to Cmn are generated at intersecting points between the first and second electrodes. The variations in capacitance C11 to Cmn generated at the intersections of the first and second electrodes may be variations in mutual-capacitance generated by driving signals applied to the first electrodes by the driving circuit unit 420. Meanwhile, the driving circuit unit 420, the sensing circuit unit 430, the signal converting unit 440, and the calculating unit 450 may be configured as an integrated circuit (IC).

The driving circuit unit 420 applies predetermined driving signals to the first electrodes of the panel unit 410. The driving signals may have a square wave, a sine wave, a triangle wave, and the like having a predetermined cycle and a predetermined amplitude. The driving signals may be sequentially applied to the plurality of first electrodes, respectively. As shown in FIG. 4, the circuits for generating and applying the driving signals to the first electrodes are individually connected to the plurality of respective first electrodes. However, a single driving signal generating circuit may be used together with a switching circuit such that it may apply the driving signals to the plurality of first electrodes through the switching circuit.

The sensing circuit unit 430 may include integral circuits for sensing the variations in capacitance C11 to Cmn from the second electrodes. The integral circuit may include at least one operational amplifier and a capacitor C1 having a predetermined capacitance. An inversion input terminal of the operational amplifier is connected to the second electrode to convert the variations in capacitance C11 to Cmn to analog signals such as voltage signals and output the signals. When the driving signals are sequentially applied to the plurality of first electrodes, respectively, the variations in capacitance may be simultaneously detected from the plurality of second electrodes, and thus, the number of integral circuits may correspond to the number (m) of the second electrodes.

The signal converting unit 440 generates a digital signal $S_D$ from the analog signal generated by the integral circuit. For example, the signal converting unit 440 may include a time-to-digital converter (TDC) circuit measuring a time required for a voltage type analog signal outputted from the sensing circuit unit 430 to reach a predetermined reference voltage level and converting the measured time into a digital signal $S_D$, or an analog-to-digital converter (ADC) circuit measuring a variation in a level of an analog signal outputted from the sensing circuit unit 430 for a predetermined time and converting the measured variation into a digital signal $S_D$. The calculating unit 450 determines the touch applied to the panel unit 410 by using the digital signal $S_D$. For example, the calculating unit 450 may determine the number of touches applied to the panel unit 410, coordinates of the touch, movements during the touch, and the like.

The operating method, in which the driving circuit unit 420 applies predetermined driving signals to the panel unit 410 and the sensing circuit unit 430 senses variations in mutual-capacitance C11 to Cmn, may allow for accurate determination of coordinates of a plurality of touches, but it causes relatively high power consumption. This may be an important issue particularly in a mobile apparatus having a limited supply of electrical power due to use of a battery therein. Accordingly, in order to reduce electrical power consumed in the touch sensing apparatus, a driving method of switching an operating mode of the touch sensing apparatus to a sleep mode or an active mode may be additionally adopted. Hereinafter, referring to FIGS. 5 and 7, the operating method will be described in detail.

Figure 5A:
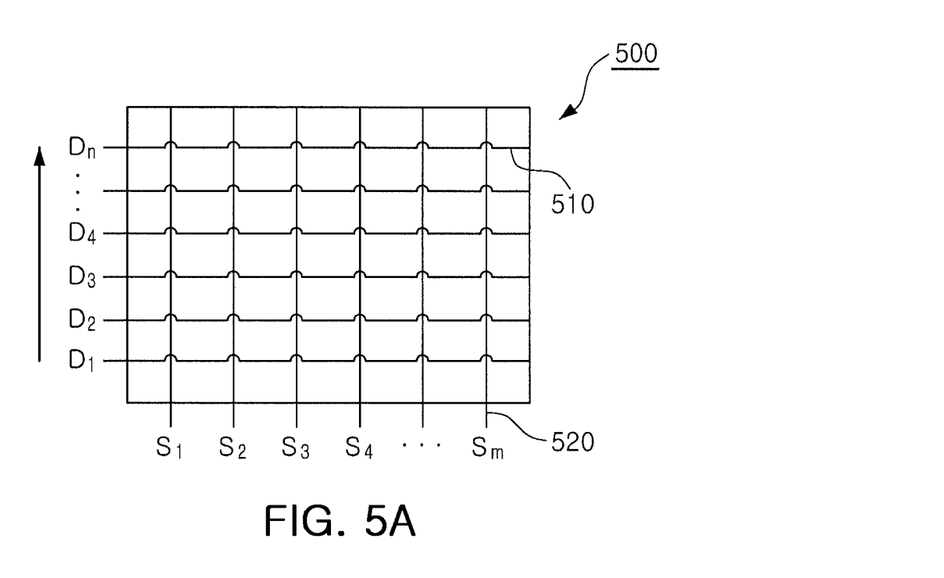
FIGS. 5A and 5B are views illustrating an operating method of a touch sensing apparatus according to an embodiment of the present invention.
Figure 5B:
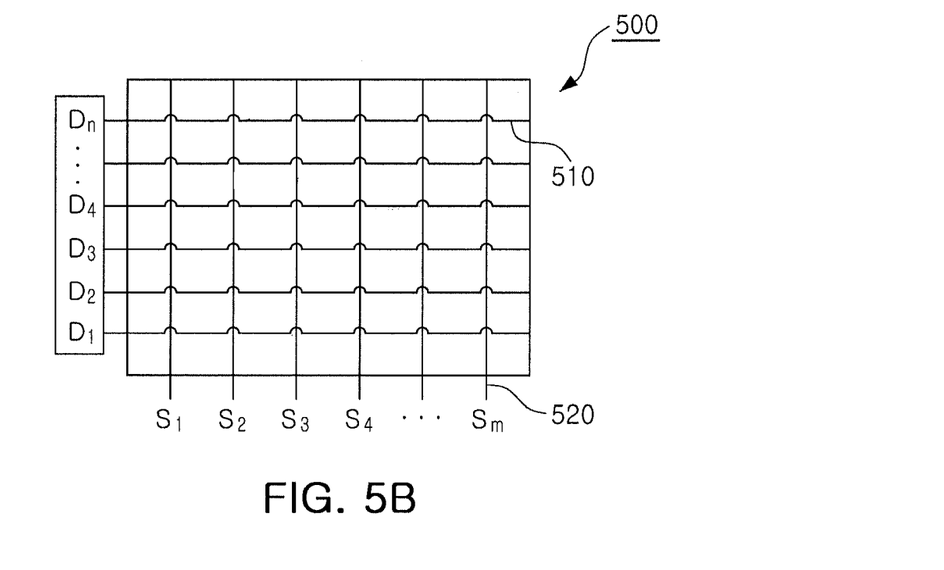

FIGS. 5A and 5B are views illustrating an operating method of a touch sensing apparatus according to an embodiment of the present invention. FIG. 5A illustrates that a touch sensing apparatus 500 operates in an active mode, and FIG. 5B illustrates that the touch sensing apparatus 500 operates in a sleep mode.

First, referring to FIGS. 5A and 5B, a plurality of first electrodes 510 extending in an X-axis direction (horizontal direction) and a plurality of second electrodes 520 extending in a Y-axis direction (vertical direction) are provided on a panel to intersect each other. The first electrodes 510 are connected to channels $D_1$ to $D_n$ to which driving signals are supplied, respectively, and the second electrodes 520 are connected to channels $S_1$ to $S_m$ detecting sensed signals, respectively. That is, the first electrodes 510 and the second electrode 520 are arranged on the panel in an n×m matrix.

Referring to the active mode operation depicted in FIG. 5A, the driving signals are sequentially applied to the plurality of first electrodes 510, respectively. In FIG. 5A, the driving signals are applied in order of $D_1$ to $D_n$; however, regardless of the order, the active mode operation is defined in that the driving signals are individually applied to the plurality of first electrodes 510. The driving circuit unit 420 may sequentially apply the driving signals to the first electrodes and the sensing circuit unit 430 may detect variations in capacitance from the second electrodes 520 intersecting the first electrodes 510. The sensing circuit unit 430 converts the variations in capacitance into analog signals such as voltage signals and detects the converted analog signals, and the signal converting unit 440 converts the detected analog signals into digital signals, and the calculating unit 450 determines touches therefrom.

Referring to the sleep mode operation depicted in FIG. 5B, the driving signals are simultaneously applied to the plurality of first electrodes 510 through the driving signal applying channels $D_1$ to $D_n$ connected to the first electrodes 510. The sensing circuit unit 430 detects variations in capacitance through the signal sensing channels $S_1$ to $S_m$ and generates analog signals. In particular, the sensing circuit unit 430 may simultaneously detect the variations in capacitance from the plurality of second electrodes 520 through the signal sensing channels $S_1$ to $S_m$. That is, such an operating method allows for determination whether a valid touch is generated, only by a single driving signal applying operation and a single signal sensing operation.

Figure 6:
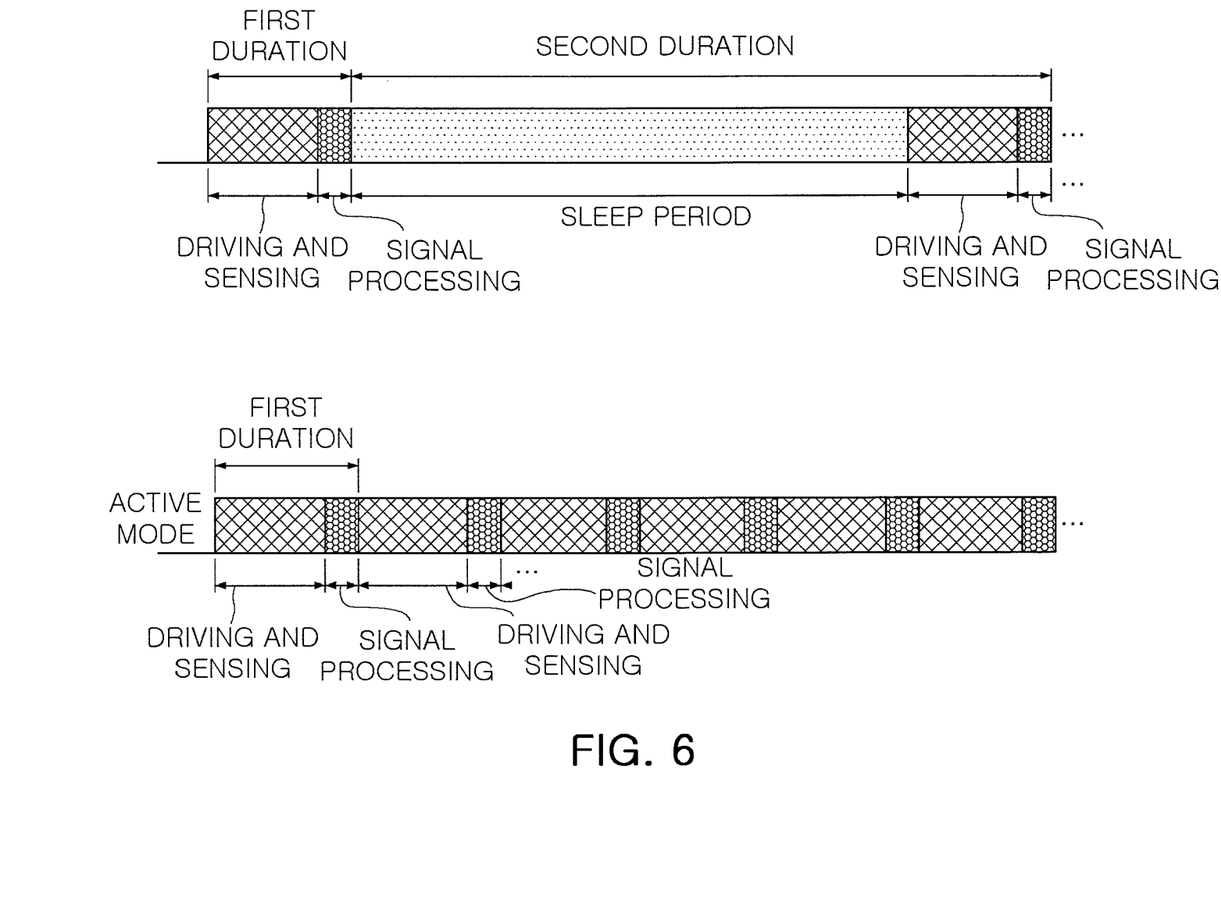
FIGS. 6 and 7 are timing diagrams illustrating an operating method of a touch sensing apparatus according to an embodiment of the present invention.
Figure 7:
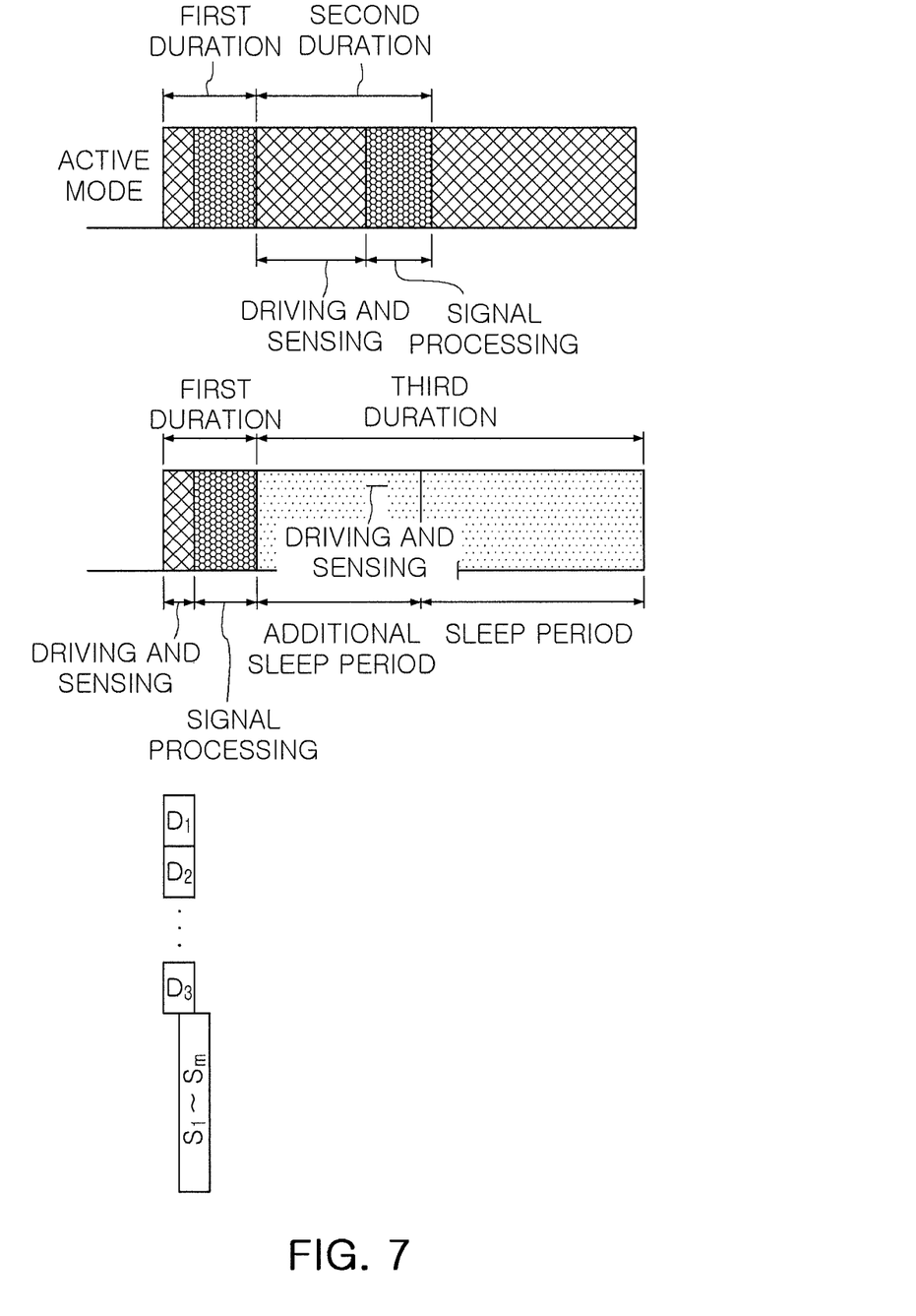

FIGS. 6 and 7 are timing diagrams illustrating an operating method of a touch sensing apparatus according to an embodiment of the present invention.

Referring to the lower diagram of FIG. 6 with regard to an active mode, a first duration is defined by combining a driving and sensing period in which the driving signal applying and signal sensing operations are performed and a signal processing period in which a touch is determined from the sensed signal. Since the driving signal applying and signal sensing operations are continuously performed and the touch is determined in the active mode, the first duration is repeated.

Referring to the upper diagram of FIG. 6 with regard to a sleep mode, the first duration defined in the active mode is shown. That is, the driving signal applying and signal sensing operations and the determination of the touch by processing the sensed signal are first performed, and then when it is determined that no touch is applied through the signal processing result in the first duration, a second duration including a sleep period is initiated. The sleep period may have a predetermined time interval, and after the sleep period elapses, it is determined whether a touch has occurred by reperforming the driving and sensing operation and the signal processing operation.

In the method of FIG. 6, overall power consumption can be reduced by alternately operating the sleep mode and the active mode. However, as shown in FIG. 6, since the first durations in the sleep mode and the active mode are operated in the same manner, even in the sleep mode, the driving signals are sequentially applied to the first electrodes 510 and the sensed signals are obtained from the second electrodes 520 intersecting the first electrodes 510, and accordingly, the first duration is relatively extended before entering the sleep period.

In the embodiment of FIG. 7, a switching operation between the active mode and the sleep mode may be implemented more efficiently than the embodiment of FIG. 6. Referring to the lower diagram of FIG. 7 with regard to the sustained sleep mode, the driving signals are simultaneously applied to the plurality of first electrodes 510 through the driving signal applying channels $D_1$ to $D_n$ in the driving and sensing period included in the first duration. Further, the sensed signals are simultaneously detected from the plurality of second electrodes 520 through the signal sensing channels $S_1$ to $S_m$. Therefore, as shown in FIG. 7, the driving and sensing period included in the first duration is shown to be shorter than that of FIG. 6.

In the first duration of the sleep mode, the operation of determining the touch from the signal sensed through the driving and sensing operation may be performed in the signal processing period. In the signal processing period, the signal converting unit 440 converts the analog signals detected by the sensing circuit unit 430 into the digital signals and the calculating unit 450 determines the touch based thereon. However, unlike the case of FIG. 6, since the driving signals are simultaneously applied to the first electrodes 510, an exact coordinate of the touch may not be determined and only whether the touch is applied and whether the applied touch is an incorrect touch such as a palm touch may be determined.

For example, when the signal converting unit 440 includes the time-to-digital converter (TDC) circuit, the calculating unit 450 may apply a reference voltage value of the TDC circuit in the first duration of the sleep mode which is different from a reference voltage value in the first duration of the active mode. Further, when the signal converting unit 440 includes the analog-to-digital converter (ADC) circuit, the calculating unit 450 may apply a reference time of the ADC circuit in the first duration of the sleep mode which is different from a reference time in the first duration of the active mode. In order to prevent the sleep mode from being cancelled due to an incorrect touch such as electric noise, a palm touch, a water droplet impact, or the like, a reference value applied to the signal converting unit 440 in the first duration of the sleep mode may be obtained from a data value which is experimentally obtained.

Since the driving signals are simultaneously applied to the plurality of first electrodes 510 to complete the driving and sensing operation in the first duration through only a single driving signal applying operation and a single signal sensing operation, an additional sleep period may be obtained as shown in the lower diagram of FIG. 7. When it is determined that the signal processing period is terminated and no valid touch has occurred, the touch sensing apparatus is controlled to immediately enter a third duration including a sleep period, whereby power consumption can be reduced by using the shortened driving and sensing period as the additional sleep period.

The upper diagram of FIG. 7 illustrates that the sleep mode is switched to the active mode. First, the driving and sensing operation and the signal processing operation are performed in the same first duration as that of the lower diagram of FIG. 7, and as a result, when it is determined that a valid touch is provided, the touch sensing apparatus is controlled to enter the second duration at the same time when the first duration is terminated. In the second duration in which the touch sensing operation is performed, the driving signals are sequentially applied to the plurality of first electrodes 510 and the sensed signals are detected from the second electrodes 520 intersecting the first electrodes 510 to determine the touch. In this case, the driving signals simultaneously applied to the plurality of first electrodes 510 in the first duration and the driving signals sequentially applied to the plurality of first electrodes 510, in the second duration may have different levels, cycles, phases, and the like.

Figure 8:
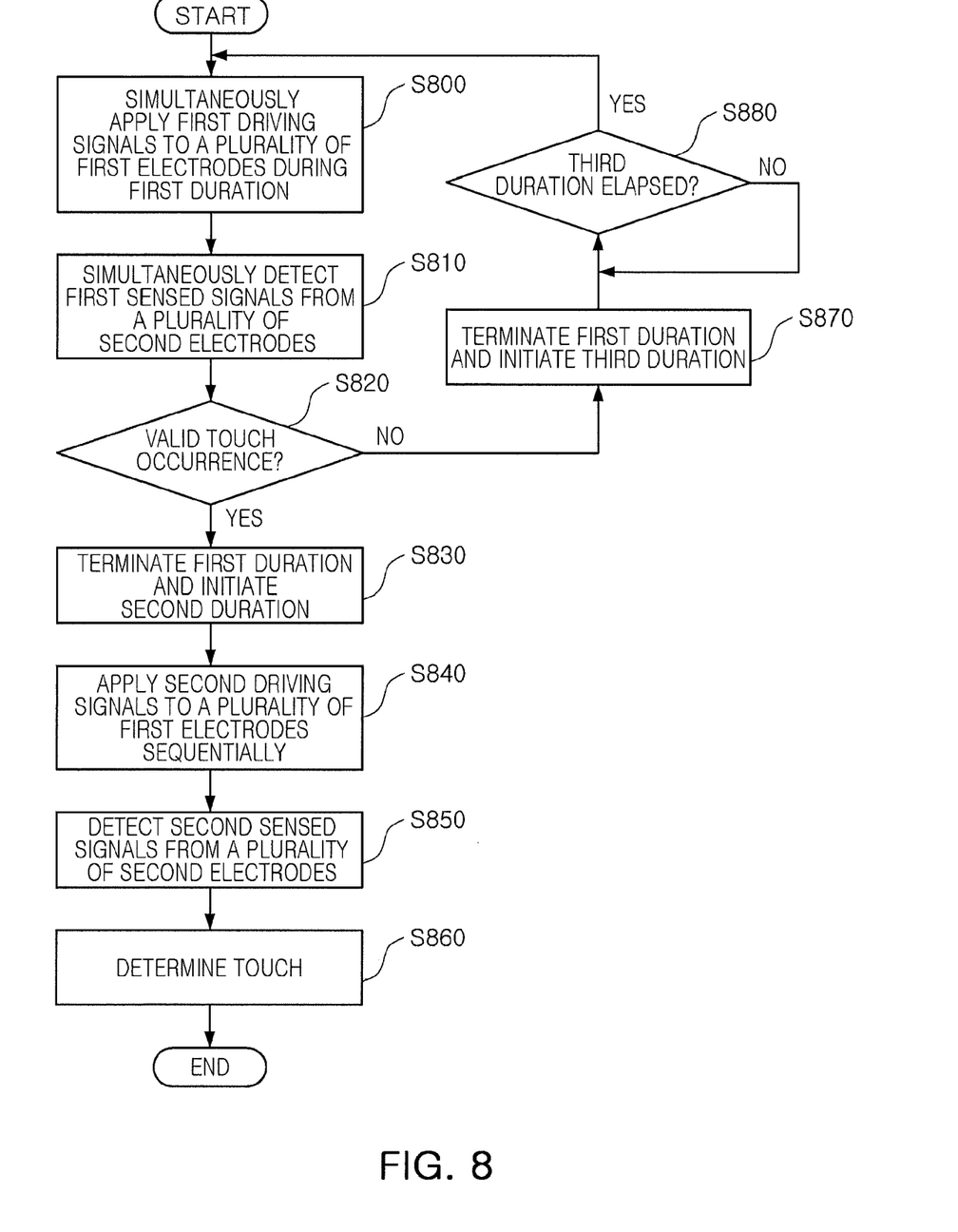
FIG. 8 is a flowchart illustrating an operating method of a touch sensing apparatus according to an embodiment of the present invention.

FIG. 8 is a flowchart illustrating an operating method of a touch sensing apparatus according to an embodiment of the present invention.

Referring to FIG. 8, an operating method of a touch sensing apparatus according to an embodiment of the invention starts with simultaneously applying first driving signals to the plurality of first electrodes 510 during the first duration (S800). When the first driving signals are simultaneously applied to the plurality of first electrodes 510, the sensing circuit unit 430 simultaneously detects first sensed signals from the plurality of second electrodes 520 intersecting the plurality of first electrodes 510 (S810).

The first sensed signals detected by the sensing circuit unit 430 are converted into digital signals by the signal converting unit 440 and the calculating unit 450 determines whether a valid touch has occurred based thereon (S820). According to the result of operation S820, when it is determined that a valid touch has occurred, the touch sensing apparatus is controlled to terminate the first duration and enter the second duration (S830). As shown in the upper diagram of FIG. 7, when it is determined that the valid touch has occurred through the driving and sensing operation and the signal processing operation in the first duration, the touch sensing apparatus enters the second duration and second driving signals are sequentially applied to the plurality of first electrodes 510 (S840).

The second driving signals applied in operation S840 may be the same as or different from the first driving signals applied in operation S800, and the driving and sensing operation of the second duration is initiated in operation S840. The sensing circuit unit 430 detects second sensed signals from the second electrodes 520 intersecting the first electrodes 510 to which the second driving signals are applied (S850), and the second sensed signals are converted into digital signals by the signal converting unit 440 to be used for the calculating unit 450 to determine a touch (S860). Operations S840 and S850 may be performed in the driving and sensing period of the second duration in the upper diagram of FIG. 7 and operation S860 may be performed in the signal processing period of the second duration in the upper diagram of FIG. 7.

Meanwhile, according to the result of operation S820, when it is determined that a valid touch has not occurred, the touch sensing apparatus is controlled to terminate the first duration and enter the third duration (S870). Referring to the lower diagram of FIG. 7, when it is determined that the valid touch has not occurred in the signal processing period of the first duration, the third duration including the sleep period is initiated after the first duration elapses. As described above, in the third duration including the sleep period in the present embodiment, a sleep period additionally provided as the driving signals are simultaneously applied to the plurality of first electrodes 510 in the driving and sensing operation of the first duration may be used, and as a result, power consumption can be reduced.

The touch sensing apparatus determines whether the third duration has elapsed, and according to the result of the determination, the touch sensing apparatus determines whether to maintain the third duration or restart the first duration (S880). When it is determined that the third duration has not elapsed, the sleep period is maintained, and when it is determined that the third duration has completely elapsed, it is determined whether a valid touch has occurred by reperforming the driving and sensing operation of the first duration (S800 to S820) to determine whether to cancel the sleep mode and enter the second duration corresponding to the active mode.

Asset forth above, according to the embodiments of the present invention, the duration of the sleep mode is maximized by simplifying the operating method for determining whether a touch is applied in the sleep mode to thereby reduce power consumption, and the touch sensing apparatus is switched to the active mode only when a valid touch is applied in the sleep mode to thereby ensure a stable touch sensing operation.

While the present invention has been shown and described in connection with the embodiments, it will be apparent to those skilled in the art that modifications and variations can be made without departing from the spirit and scope of the invention as defined by the appended claims.

What is claimed is:

1. A touch sensing apparatus, comprising:
a panel unit including a plurality of first electrodes and a plurality of second electrodes, the first and second electrodes intersecting each other;
a circuit unit applying first driving signals to the plurality of first electrodes and detecting first sensed signals from the plurality of second electrodes; and
a control unit controlling an operation of the circuit unit,
the control unit controlling the circuit unit to simultaneously apply the first driving signals to the plurality of first electrodes during a first duration corresponding to a sleep mode and detect the first sensed signals from the plurality of second electrodes, and determining whether a valid touch has occurred during the first duration to determine whether to cancel the sleep mode, and
when it is determined that the valid touch has occurred during the first duration, the control unit terminates the first duration to cancel the sleep mode,
the control unit initiates a second duration corresponding to an active mode after cancelling the sleep mode by terminating the first duration, and controls the circuit unit to sequentially apply second driving signals to the plurality of first electrodes during the second duration and detect second sensed signals from the plurality of second electrodes, and
the control unit sets a first reference value, for determining whether a valid touch has occurred during the first duration corresponding to the sleep mode, and a second reference value, for determining whether a valid touch has occurred during the second duration corresponding to the active mode, to be different from each other.

2. The touch sensing apparatus of claim 1, wherein the control unit determines a touch from the second sensed signals.

3. The touch sensing apparatus of claim 1, wherein the control unit controls the circuit unit to individually apply second driving signals to the plurality of respective first electrodes, during the second duration corresponding to an active mode.

4. The touch sensing apparatus of claim 3, wherein the control unit sets the first reference value and the second reference value as a voltage level or a time.

5. An operating method of a touch sensing apparatus, comprising:
simultaneously applying first driving signals to a plurality of first electrodes during a first duration;
simultaneously detecting first sensed signals from a plurality of second electrodes intersecting the plurality of first electrodes;

determining whether a valid touch has occurred based on the first sensed signals;

determining whether to terminate the first duration according to valid touch occurrence;

terminating the first duration and initiating a second duration when the valid touch has occurred, and sequentially applying second driving signals to the plurality of first electrodes; and determining a touch by detecting second sensed signals from the plurality of second electrodes, the determining of the touch including determining whether the valid touch has occurred by comparing the second sensed signals with a predetermined second reference value, the determining of the valid touch occurrence including determining whether the valid touch has occurred by comparing the first sensed signals with a predetermined first reference value, and the first reference and the second reference set to be different from each other.

6. The operating method of claim 5, wherein the first duration corresponds to a sleep mode of the touch sensing apparatus, and the second duration corresponds to an active mode of the touch sensing apparatus.

7. The operating method of claim 5, wherein, in the determining of the touch, at least one of a position, number, and movement of the touch is determined based on the second sensed signals.

8. The operating method of claim 5, further comprising:

terminating the first duration and initiating a third duration having a predetermined time range when it is determined that the valid touch has not occurred; and simultaneously applying the first driving signals to the plurality of first electrodes, by initiating the first duration when the third duration is terminated.

* * * * *